(12) United States Patent
Asami et al.

(10) Patent No.: US 10,637,057 B2
(45) Date of Patent: Apr. 28, 2020

(54) METHOD FOR MANUFACTURING SLURRY FOR POSITIVE ELECTRODE OF NONAQUEOUS ELECTROLYTE SECONDARY BATTERY AND APPARATUS THEREFOR

(71) Applicant: NIHON SPINDLE MANUFACTURING CO., LTD., Hyogo (JP)

(72) Inventors: Keiichi Asami, Hyogo (JP); Keiichiro Onishi, Hyogo (JP)

(73) Assignee: NIHON SPINDLE MANUFACTURING CO., LTD., Hyogo (JP)

( * ) Notice: Subject to any disclaimer, the term of this patent is extended or adjusted under 35 U.S.C. 154(b) by 0 days.

(21) Appl. No.: 16/437,741

(22) Filed: Jun. 11, 2019

(65) Prior Publication Data

US 2019/0296355 A1 Sep. 26, 2019

Related U.S. Application Data

(63) Continuation of application No. PCT/JP2018/023976, filed on Jun. 25, 2018.

(30) Foreign Application Priority Data

Jul. 19, 2017 (JP) ................................ 2017-140005
Nov. 21, 2017 (JP) ................................ 2017-223397

(51) Int. Cl.
*H01M 4/58* (2010.01)
*C01G 53/06* (2006.01)
(Continued)

(52) U.S. Cl.
CPC ......... *H01M 4/5825* (2013.01); *B01J 19/008* (2013.01); *C01G 53/06* (2013.01);
(Continued)

(58) Field of Classification Search
CPC ...... H01M 4/5825; H01M 4/04; B01J 19/008; C01G 53/06; C01P 2006/40
See application file for complete search history.

(56) References Cited

U.S. PATENT DOCUMENTS 8,530,082 B2    9/2013  Uchida et al.
10,243,199 B2 *  3/2019  Kim ................... H01M 4/0404
(Continued)

FOREIGN PATENT DOCUMENTS

JP    H08-069791 A      3/1996
JP    3232910 B2 *    11/2001  ............ H01M 10/05
(Continued)

OTHER PUBLICATIONS

International Search Report issued in Application No. PCT/JP2018/023976, dated Sep. 18, 2018.

*Primary Examiner* — Timothy C Vanoy
(74) *Attorney, Agent, or Firm* — Michael Best & Friedrich LLP

(57) ABSTRACT

A method for manufacturing a slurry for a positive electrode of a nonaqueous electrolyte secondary battery using an aqueous solvent containing an alkali metal complex oxide, includes: while causing a raw material slurry containing a solid content and the solvent as slurry raw materials for a positive electrode of the nonaqueous electrolyte secondary battery to flow along a path, performing a neutralization treatment on an alkali component in the raw material slurry by inorganic carbon supplied to the raw material slurry flowing along the path.

9 Claims, 5 Drawing Sheets

(51) Int. Cl.
*B01J 19/00* (2006.01)
*H01M 4/1391* (2010.01)
*H01M 4/02* (2006.01)

(52) U.S. Cl.
CPC ....... *H01M 4/1391* (2013.01); *C01P 2006/40* (2013.01); *H01M 2004/028* (2013.01)

(56) References Cited

U.S. PATENT DOCUMENTS

| | | | |
|---|---|---|---|
| 2003/0084847 A1* | 5/2003 | Wood | H01M 4/04 |
| | | | 118/688 |
| 2015/0034862 A1 | 2/2015 | Kifune | |
| 2017/0221644 A1* | 8/2017 | Kubota | H01M 4/0404 |
| 2018/0183047 A1 | 6/2018 | Sakamoto et al. | |

FOREIGN PATENT DOCUMENTS

| | | | | |
|---|---|---|---|---|
| JP | 2002-141059 A | 5/2002 | | |
| JP | 5158453 B2 * | 3/2013 | ......... | H01M 4/1391 |
| JP | 2017-100117 A | 6/2017 | | |
| WO | WO-2011/004447 A1 | 1/2011 | | |
| WO | WO-2013/136828 A1 | 9/2013 | | |
| WO | WO-2017/138192 A1 | 8/2017 | | |

* cited by examiner

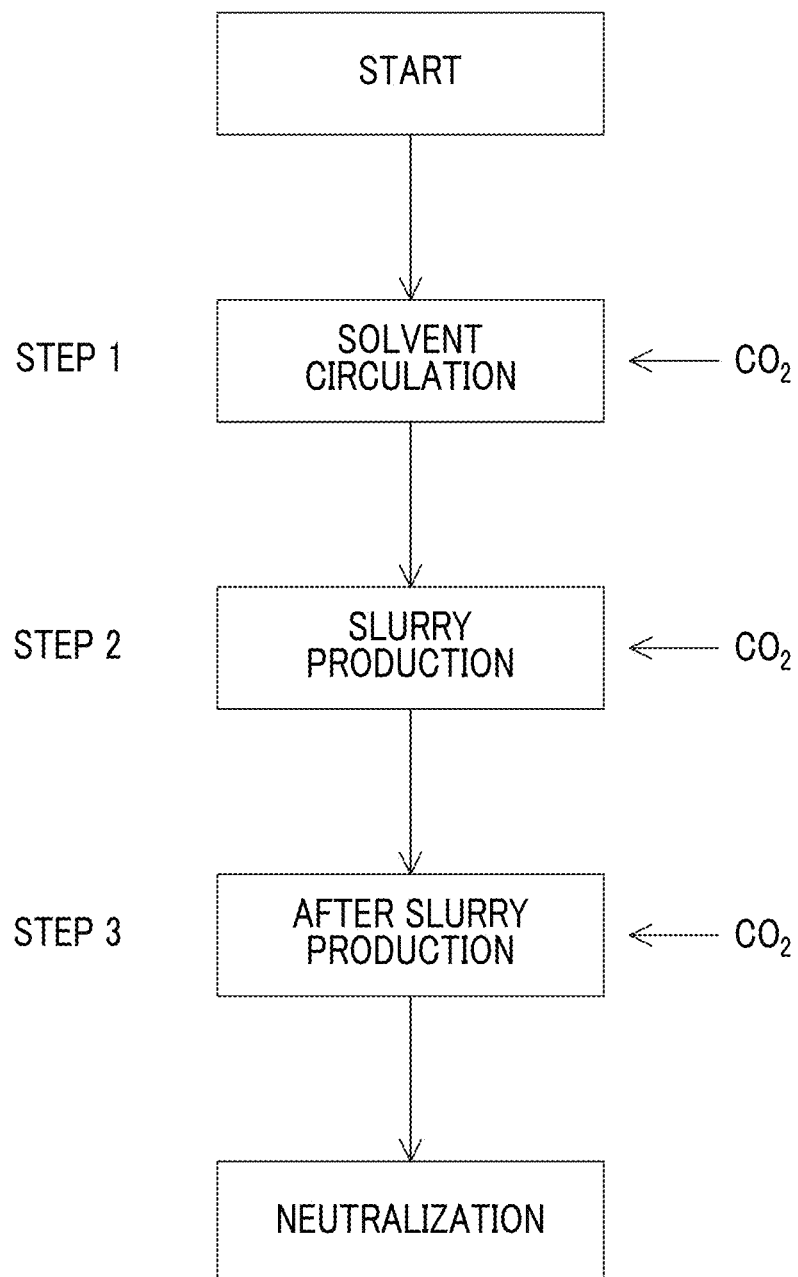

METHOD FOR MANUFACTURING SLURRY FOR POSITIVE ELECTRODE OF NONAQUEOUS ELECTROLYTE SECONDARY BATTERY AND APPARATUS THEREFOR

RELATED APPLICATIONS

The contents of Japanese Patent Application No. 2017-140005, filed Jul. 19, 2017, Japanese Patent Application No. 2017-223397, filed Nov. 21, 2017, and of International Patent Application No. PCT/JP2018/023976, on the basis of each of which priority benefits are claimed in an accompanying application data sheet, are in their entirety incorporated herein by reference.

BACKGROUND

Technical Field

Certain embodiments of the present invention relate to a method for manufacturing a slurry for a positive electrode of a nonaqueous electrolyte secondary battery and an apparatus therefor.

Description of Related Art

A positive electrode and a negative electrode of a battery are produced by coating a current collector with a slurry containing an active material, a binder, and carbon black which is added if necessary.

Particularly, in a negative electrode, as a binder for the negative electrode, a binder represented by styrene-butadiene rubber (SBR) is mainly used, and an aqueous negative electrode slurry is mainly used.

In contrast, in a positive electrode, as a binder for a positive electrode, because a butadiene component is vulnerable to oxidation degradation, a solvent-based binder based on polyvinylidene fluoride (PVDF) is used mainly in practical batteries.

Incidentally, in the PVDF-based binder used as the aforementioned binder for a positive electrode, as a solvent of a slurry, an organic solvent N-methyl pyrrolidone (NMP) is used, and hence the binder causes a big environmental load.

Therefore, similar to the negative electrode, in the positive electrode, production of aqueous slurries that cause a light environmental load is drawing attention.

Herein, although an alkali metal complex oxide is used as the material for the positive electrode, since the alkali metal complex oxide is required to have physical properties such as (1) a high voltage, (2) a high charging and discharging efficiency, and (3) a high electrode density, lithium cobaltate ($LiCoO_2$) has been hitherto adopted in order to satisfy such performances in a well-balanced manner.

In view of the resource limitations on cobalt materials, alternative materials are under examinations, and a plurality of materials such as ternary materials ($LiNi_{0.33}Co_{0.33}Mn_{0.33}O_2$ (NCM111), $LiNi_{0.5}Co_{0.2}Mn_{0.3}O_2$ (NCM523), and the like), manganese-based materials ($LiMn_2O_4$), nickel-based materials ($LiNiCoAlO_2$), and iron-based materials ($LiFePO_4$) have been put to practical use or developed, and improvements and modifications thereof are currently in progress. In addition to these materials, materials based on sulfur (including organic sulfur), solid solutions, and silicates are drawing attention as next-generation material candidates.

In alkali metal complex oxides used as such materials for a positive electrode, that is, high capacity type lithium complex oxides such as based on nickel ($LiNiCoAlO_2$) or ternary materials ($LiNi_{0.6}Co_{0.2}Mn_{0.2}O_2$ (NCM622), $LiNi_{0.8}Co_{0.1}Mn_{0.1}O_2$ (NCM811), and the like), an excess of lithium hydroxide, which is added during synthesis, remains, and this substance increases the pH level by coming into contact with water. A strong alkaline slurry with a pH level of higher than 11 corrodes an aluminum current collector at the time of coating and generates hydrogen gas in the interface between the active material layer and the aluminum current collector. Due to the hydrogen gas, the active material layer foams, and this leads to a decrease in electrode strength or the exfoliation or detachment of the active material layer. Furthermore, unfortunately, it is difficult to obtain a uniform electrode.

As a measure for the above problems, a surface coating method for preventing the active material layer from coming into contact with water or a method of using a stainless steel current collector having excellent alkali resistance has been developed.

In addition, as a method for preventing the corrosion of the aluminum current collector, there is a method of controlling the pH level of a slurry by neutralizing the slurry by the addition of an acid. In this case, the pH level needs to be within a range of a pH of 3 to a pH of 10 in which aluminum does not easily dissolve. However, in a case where an inorganic acid such as hydrochloric acid, nitric acid, sulfuric acid, or hydrofluoric acid is used as a neutralizer, sometimes the active material is dissolved at the time of adding the neutralizer. Furthermore, in a case where an excess of acid is injected, the pH level rapidly decreases. Therefore, unfortunately, it is difficult to control the pH level.

When organic acids such as citric acid and acetic acid are used, there is a disadvantage that the generated salt adversely affects the battery performance.

In order to solve the above problems, the related art suggests a method for manufacturing a positive electrode mixture, in which in a kneading process of kneading a lithium complex oxide with at least either a conductive auxiliary agent or a binder resin, kneading is performed in a carbonic acid gas atmosphere.

The related art suggests a method for manufacturing a positive electrode plate by causing carbonic acid gas to flow in a paste obtained by kneading a positive electrode active material with a thickener such that the pH level of the paste becomes 7 to 11, then applying the paste to the surface of a current collector, and drying the paste.

The related art suggests a method for forming an intervening layer of an electrode by mixing microbubbles having a bubble diameter of equal to or smaller than 500 μm with an electrode mixture paste and coating a current collector of an electrode with the paste having reduced density.

SUMMARY

According to an embodiment of the present invention, there is provided a method for manufacturing a slurry for a positive electrode of a nonaqueous electrolyte secondary battery using an aqueous solvent containing an alkali metal complex oxide, including: while causing a raw material slurry containing a solid content and the solvent as slurry raw materials for a positive electrode of the nonaqueous electrolyte secondary battery to flow along a path, performing a neutralization treatment on an alkali component in the raw material slurry by inorganic carbon supplied to the raw material slurry flowing along the path.

According to another embodiment of the present invention, there is provided an apparatus for manufacturing a slurry for a positive electrode of a nonaqueous electrolyte secondary battery using an aqueous solvent containing an alkali metal complex oxide, including: a path on which a raw material slurry containing a solid content and a solvent as slurry raw materials for a positive electrode of the nonaqueous electrolyte secondary battery flows; and an inorganic carbon supply portion supplying inorganic carbon to the raw material slurry flowing along the path, in which a neutralization treatment is performed on an alkali component in the raw material slurry while causing the raw material slurry to flow along the path.

BRIEF DESCRIPTION OF THE DRAWINGS

FIG. 7 is a flowchart of the method for manufacturing a slurry for a positive electrode of a nonaqueous electrolyte secondary battery of the present invention.

DETAILED DESCRIPTION

Figure 1:
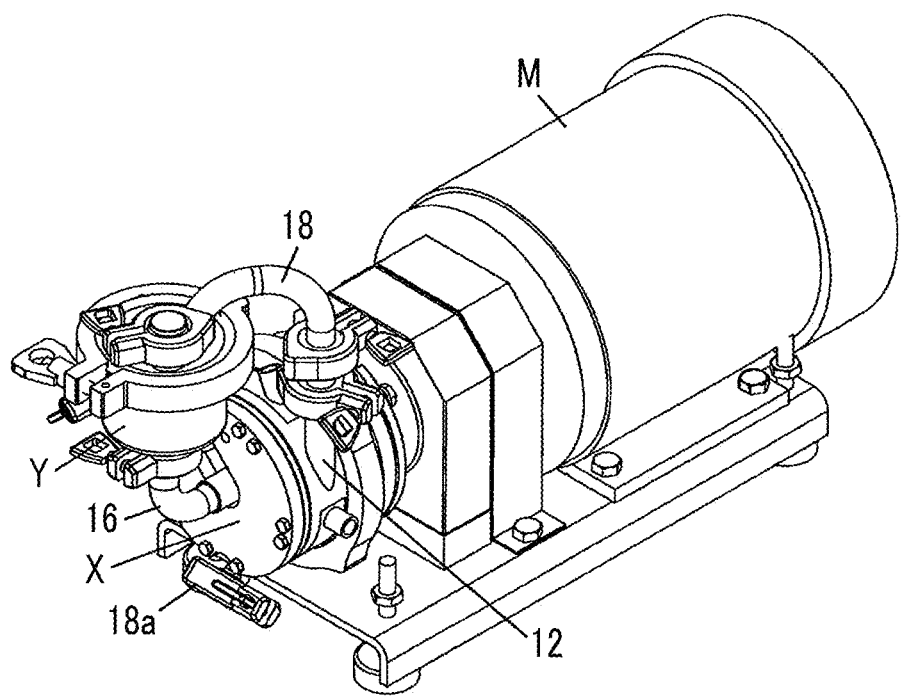
FIG. 1 is an overall perspective view illustrating an embodiment of an apparatus for manufacturing a slurry for a positive electrode of a nonaqueous electrolyte secondary battery according to an embodiment of the present invention, which implements a method for manufacturing a slurry for a positive electrode of a nonaqueous electrolyte secondary battery according to an embodiment of the present invention.
Figure 2:
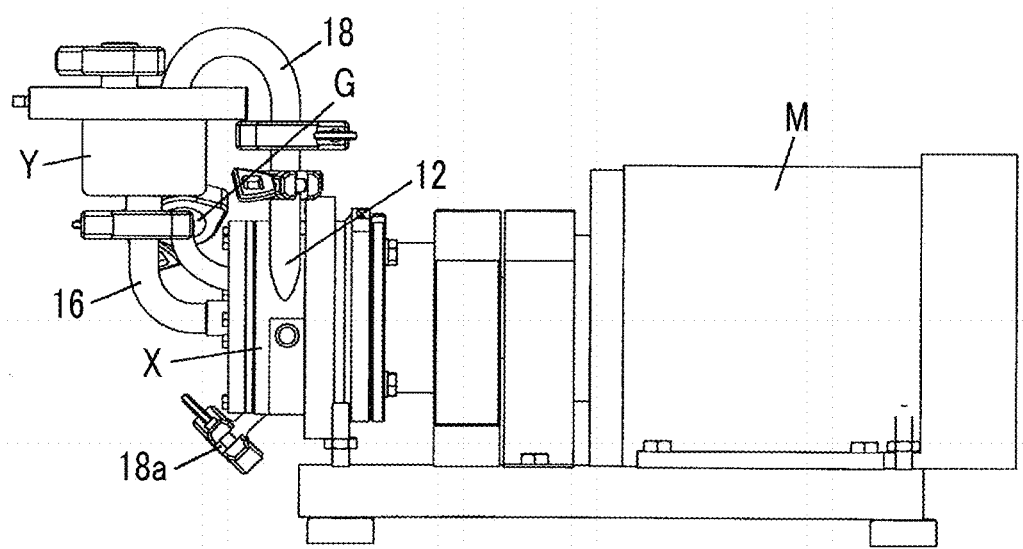
FIG. 2 is a front view of the manufacturing apparatus.
Figure 3:
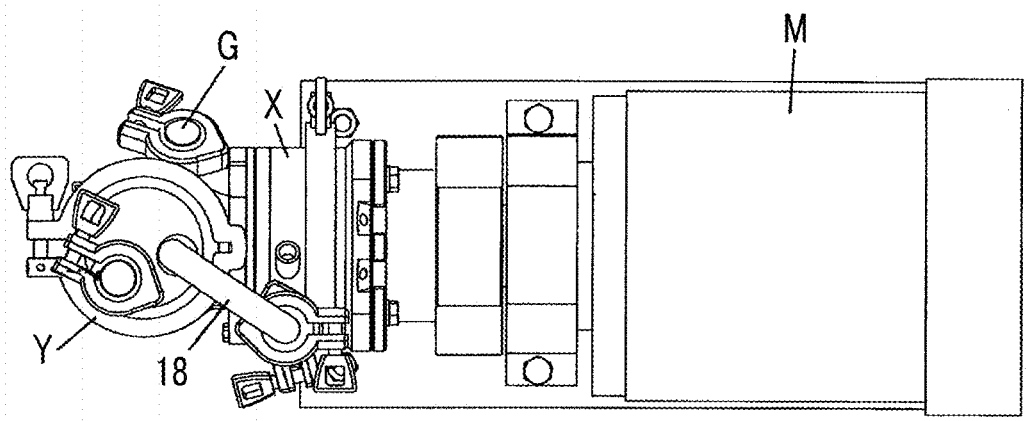
FIG. 3 is a plan view of the manufacturing apparatus.
Figure 4:
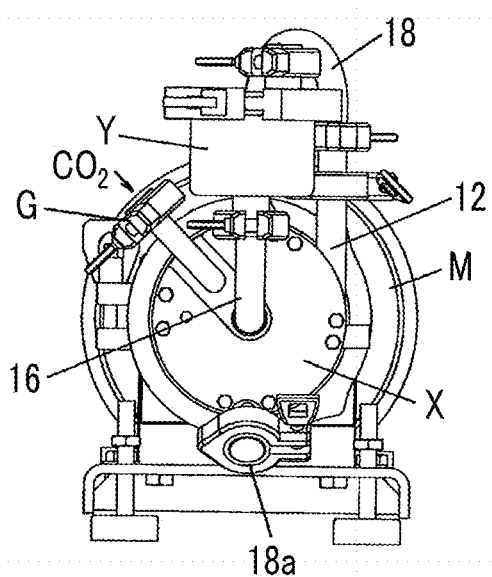
FIG. 4 is a left side view of the manufacturing apparatus.

The methods for preventing the corrosion of an aluminum current collector described in the related art have the following problems.

In the methods described in the related art, the slurry is kneaded in the carbonic acid gas atmosphere, or carbonic acid gas is caused to flow in the slurry. Accordingly, the amount of carbonic acid gas dissolved in water is small in a carbonic acid gas atmosphere under normal pressure, and the solubility of the gas in the solvent decreases due to the heat generated in the process of kneading the slurry. Therefore, there is a disadvantage that a neutralization reaction takes a long period of time.

The present invention has been made to solve the problems of the methods for preventing the corrosion of an aluminum current collector described in the related art described above. It is desirable to provide a method for manufacturing a slurry for a positive electrode of a nonaqueous electrolyte secondary battery and an apparatus therefor that make it possible to produce a slurry for a positive electrode of a nonaqueous electrolyte secondary battery with an aqueous solvent that causes a light environmental load by allowing an alkali component in a slurry containing an alkali metal complex oxide to be neutralized within a short period of time.

Herein, "inorganic carbon" includes carbonic acid gas (gas phase) and liquid phases such as carbonated water.

In this case, a pre-process of producing the raw material slurry by supplying, while causing the solvent as the slurry raw material for a positive electrode of the nonaqueous electrolyte secondary battery to flow along the path, the solid content as the slurry raw material for a positive electrode of the nonaqueous electrolyte secondary battery to the solvent flowing along the path is further included, in which the neutralization treatment may be performed on the alkali component in the raw material slurry by supplying the inorganic carbon to the raw material slurry flowing along the path.

In addition, the neutralization treatment may be performed on the alkali component in the raw material slurry while producing the raw material slurry by supplying, while causing the solvent as the slurry raw material for a positive electrode of the nonaqueous electrolyte secondary battery to flow along the path, the solid content as the slurry raw material for a positive electrode of the nonaqueous electrolyte secondary battery and the inorganic carbon to the solvent flowing along the path.

In addition, a pre-process of dissolving the inorganic carbon in the solvent by supplying, while causing the solvent as the slurry raw material for a positive electrode of the nonaqueous electrolyte secondary battery to flow along the path, the inorganic carbon to the solvent flowing along the path is further included, in which the neutralization treatment may be performed on the alkali component in the raw material slurry while producing the raw material slurry by supplying the solid content as the slurry raw material for a positive electrode of the nonaqueous electrolyte secondary battery to the solvent flowing along the path and containing dissolved inorganic carbon.

The inorganic carbon may be supplied to the path at a negative pressure.

The neutralization treatment may be performed while causing cavitation (local boiling) by causing the raw material slurry, to which the inorganic carbon is supplied, to flow through a cavitation causing portion.

In this case, unit that causes the path to be at a negative pressure is further included, in which the inorganic carbon is supplied to the path at the negative pressure.

A cavitation causing portion which performs the neutralization treatment while causing cavitation (local boiling) by causing the raw material slurry to which the inorganic carbon is supplied to flow may be further included.

According to the method for manufacturing a slurry for a positive electrode of a nonaqueous electrolyte secondary battery and the apparatus therefor according to the embodiments of the present invention, since the neutralization treatment is performed on the alkali component in the raw material slurry by the inorganic carbon supplied to the raw material slurry flowing along the path while causing the raw material slurry containing the solid content and the solvent as the slurry raw materials for a positive electrode of a nonaqueous electrolyte secondary battery to flow along the path, contact between the raw material slurry and the inorganic carbon is accelerated, so that it is possible to neutralize the alkali component in the raw material slurry containing an alkali metal complex oxide within a short period of time. As a result, the manufacturing lead time of a positive electrode of a nonaqueous electrolyte secondary battery in a case of using an aqueous solvent that causes a light environmental load can be shortened.

In addition, it is not necessary to increase the pressure of the carbonic acid gas to be supplied by supplying the inorganic carbon to the path at a negative pressure (the pressure of the carbonic acid gas to be supplied may be set to be equal to or lower than 1 MPa, preferably equal to or lower than 0.5 MPa, and more preferably equal to or lower than 0.2 MPa, and even more preferably equal to or lower than 0.1 MPa), the seal structure of the manufacturing apparatus can be simplified. In addition, the amount of dissolved inorganic carbon remaining in the slurry after the neutralization treatment can be reduced, so that a subsequent deaeration treatment can be easily performed. Furthermore, since cavitation (local boiling) can be easily caused, the neutralization treatment can be accelerated.

In addition, by performing the neutralization treatment while causing cavitation (local boiling) by causing the raw material slurry, to which the inorganic carbon is supplied, to flow through the cavitation causing portion, bubbles of the inorganic carbon are repeatedly expanded and contracted by the cavitation (local boiling), and thus the contact area with the solvent or the raw material slurry increases, so that the neutralization can be rapidly advanced. As a result, it is possible to neutralize the alkali component in the raw material slurry containing an alkali metal complex oxide within a shorter period of time. Moreover, an excess of inorganic carbonic acid after the neutralization treatment of the alkali component in the raw material slurry can be easily deaerated in the form of bubbles by causing cavitation (local boiling). Therefore, impurities do not remain in the slurry, a non-conductive layer is not formed in the interface between a current collector and an active material layer, and the conductivity or the battery characteristics can be improved.

Herein, it is considered that the reaction process of the aforementioned neutralization treatment generally includes a process of supply of the inorganic carbon (carbonic acid gas)→dissolution of the inorganic carbon (carbonic acid gas)→diffusion of the inorganic carbon (carbonic acid gas)→the neutralization treatment of the alkali component in the raw material slurry. In addition, it is considered that since the reaction rate of the neutralization treatment is higher than the diffusion rate, the rates of dissolution and diffusion in this reaction process are limited. The dissolution rate increases with pressure and interfacial area. Herein, by increasing the interfacial area, and more specifically, by an increase in the interfacial area caused by the expansion and contraction effect of bubbles of the carbonic acid gas by cavitation (local boiling) in addition to the effect of increasing the diffusion rate of the inorganic carbon (carbonic acid gas) into the raw material slurry by flow (mixing) and condensation of the carbonic acid gas in the bubbles due to pressure recovery, the dissolution rate is increased by the effect of dissolution in the raw material slurry (the effect of compensating for the decrease in the dissolution rate due to the decrease in pressure and exceeding this) and the reaction is accelerated.

Hereinafter, embodiments of the method for manufacturing a slurry for a positive electrode of a nonaqueous electrolyte secondary battery and an apparatus thereof of the present invention will be described.

Method for Manufacturing Slurry for Positive Electrode of Nonaqueous Electrolyte Secondary Battery The present invention is a method for manufacturing a slurry for a positive electrode of a nonaqueous electrolyte secondary battery using an aqueous solvent containing an alkali metal complex oxide, and includes, while causing a raw material slurry containing a solid content and a solvent as slurry raw materials for a positive electrode of the nonaqueous electrolyte secondary battery, to flow along a path, performing a neutralization treatment on an alkali component in the raw material slurry by inorganic carbon supplied to the raw material slurry flowing along the path.

Herein, "inorganic carbon" includes carbonic acid gas (gas phase) and liquid phases such as carbonated water.

As a neutralizer, carbonic acid gas is used in the form of dissolved inorganic carbon by being dissolved in a solvent. This is not only because the reaction rate is high as described above, but because the pH level does not become lower than 3 even though an excess of neutralizer is added (the same applies to the case of using a liquid phase such as carbonated water, and hereinafter, the case of using carbonic acid gas will be described as an example).

As shown in the following reaction formula, through the neutralization reaction caused by the carbonic acid gas, an alkali metal carbonate and an alkali metal hydrogen carbonate are generated as salts. By drying the slurry in which the alkali metal carbonate and the alkali metal hydrogen carbonate are dissolved, it is possible to obtain an electrode coated with the alkali metal carbonate.

First neutralization reaction: $2AOH + H_2CO_3 \rightarrow A_2CO_3 + 2H_2O$

Second neutralization reaction: $A_2CO_3 + H_2CO_3 \rightarrow 2AHCO_3$ For example, in a case where an alkali metal A is lithium, as shown in the following reaction formula, lithium carbonate and lithium hydrogen carbonate are generated as salts. By drying the slurry in which the lithium carbonate and the lithium hydrogen carbonate are dissolved, it is possible to obtain an electrode coated with the lithium carbonate.

First neutralization reaction: $2LiOH + H_2CO_3 \rightarrow Li_2CO_3 + 2H_2O$

Second neutralization reaction: $Li_2CO_3 + H_2CO_3 \rightarrow 2LiHCO_3$ As described in the related art, it is known that a positive electrode coated with lithium carbonate improves the water resistance of the electrode.

The electrode manufactured by the method for manufacturing a slurry for a positive electrode of a nonaqueous electrolyte secondary battery of the present invention contains a salt (any of lithium carbonate, sodium carbonate, and potassium carbonate) generated by neutralization in the active material layer.

In a case where the electrode does not contain an alkali metal carbonate (any of lithium carbonate, sodium carbonate, and potassium carbonate), the electrolytic solution is decomposed due to overcharging and generates a hydrocarbon gas or a hydrogen gas that is highly flammable. On the contrary, in the electrode containing an alkali metal carbonate, in a case where the battery is overcharged, carbonic acid gas is generated before the electrolytic solution or the positive electrode is decomposed. Therefore, by increasing the internal pressure of the battery by using the carbonic acid gas, a pressure valve mounted on the battery can be operated. The gas mainly released at this time is carbonic acid gas which is safe.

The neutralization treatment of the raw material slurry can be performed by the following (1) to (3) singly or in combination as appropriate.

(1) After the raw material slurry for a slurry for a positive electrode of a nonaqueous electrolyte secondary battery is produced, the neutralization treatment is performed on the alkali component in the raw material slurry by supplying (post-supplying) carbonic acid gas (inorganic carbon) to the raw material slurry flowing along a path.

(2) While producing the raw material slurry by supplying (simultaneously supplying with a solid content), while causing the solvent as a slurry raw material for a positive electrode of the nonaqueous electrolyte secondary battery to flow along the path, the solid content as a slurry raw material for a positive electrode of the nonaqueous electrolyte secondary battery and the carbonic acid gas (inorganic carbon)

to the solvent flowing along the path, the neutralization treatment is performed on the alkali component in the raw material slurry.

(3) While producing the raw material slurry by supplying, while causing the solvent as the slurry raw material for a positive electrode of the nonaqueous electrolyte secondary battery to flow along the path, after dissolving the carbonic acid gas (inorganic carbon) in the solvent by supplying (pre-supplying) the carbonic acid gas (inorganic carbon) to the solvent flowing along the path, the solid content as the slurry raw material for a positive electrode of the nonaqueous electrolyte secondary battery to the solvent which flows along the path and contains the carbonic acid gas (inorganic carbon) dissolved therein, the neutralization treatment is performed on the alkali component in the raw material slurry.

As described above, since the neutralization treatment is performed on the alkali component in the raw material slurry by the carbonic acid gas (inorganic carbon) supplied to the raw material slurry flowing along the path while causing the raw material slurry containing the solid content and the solvent as the slurry raw materials for a positive electrode of a nonaqueous electrolyte secondary battery to flow along the path, contact between the raw material slurry and the carbonic acid gas (inorganic carbon) is accelerated, so that it is possible to neutralize the alkali component in the raw material slurry containing an alkali metal complex oxide within a short period of time.

The amount of the carbonic acid gas used is set such that the pH level of the raw material slurry becomes 4 to 11, preferably becomes 5 to 10, and more preferably becomes 6 to 9 by the addition of the carbonic acid gas.

The pressure of the carbonic acid gas is not particularly limited as long as it is a pressure (typically normal pressure) at which the carbonic acid gas (inorganic carbon) can be supplied to the raw material slurry or the solvent flowing along the path.

However, it is not necessary to increase the pressure of the carbonic acid gas to be supplied by setting the path (in the system of the apparatus) on which the carbonic acid gas (inorganic carbon) is supplied to a negative pressure, and a pressure set by aspiration force acting on the path is sufficient. In a case where the pressure of the carbonic acid gas is a high pressure, not only the complexity of a seal structure and the like in the manufacturing apparatus, but the amount of the dissolved inorganic carbon remaining in the slurry having undergone the neutralization treatment increases, and hence a deaeration treatment to be performed later becomes difficult. Therefore, the pressure of the carbonic acid gas to be supplied is set to be equal to or lower than 1 MPa, preferably equal to or lower than 0.5 MPa, and more preferably equal to or lower than 0.2 MPa, and even more preferably equal to or lower than 0.1 MPa.

Herein, by performing the neutralization treatment while causing cavitation (local boiling) by setting the path (in the system of the apparatus) on which the carbonic acid gas (inorganic carbon) is supplied to a negative pressure and causing the raw material slurry to flow through a cavitation causing portion, bubbles of the inorganic carbon are repeatedly expanded and contracted by the cavitation (local boiling), and thus the contact area with the solvent or the raw material slurry increases, so that the neutralization can be rapidly advanced and it is possible to neutralize the alkali component in the raw material slurry containing an alkali metal complex oxide within a shorter period of time.

However, it is considered that the reaction process of the aforementioned neutralization treatment generally includes a process of supply of the inorganic carbon (carbonic acid gas)→dissolution of the inorganic carbon (carbonic acid gas)→diffusion of the inorganic carbon (carbonic acid gas)→the neutralization treatment of the alkali component in the raw material slurry. In addition, it is considered that since the reaction rate of the neutralization treatment is higher than the diffusion rate, the rates of dissolution and diffusion in this reaction process are limited. The dissolution rate increases with pressure and interfacial area. Herein, by increasing the interfacial area, and more specifically, by an increase in the interfacial area caused by the expansion and contraction effect of bubbles of the carbonic acid gas by cavitation (local boiling) in addition to the effect of increasing the diffusion rate of the inorganic carbon (carbonic acid gas) into the raw material slurry by flow (mixing) and condensation of the carbonic acid gas in the bubbles due to pressure recovery, the dissolution rate is increased by the effect of dissolution in the raw material slurry (the effect of compensating for the decrease in the dissolution rate due to the decrease in pressure and exceeding this) and the neutralization reaction is accelerated.

Because the dissolved inorganic carbon remains in the raw material slurry having undergone the neutralization treatment, a deaeration treatment is performed.

In a case where the electrode is coated without performing the deaeration treatment, the active material layer foams in a drying process due to the dissolved inorganic carbon, and too many voids are formed. Therefore, coating unevenness or the exfoliation or detachment of the electrode easily occurs.

By performing the deaeration treatment, the dissolved inorganic carbon in the raw material slurry can be separated as carbonic acid gas from the neutralized slurry.

Although membrane deaeration is mainly performed as the deaeration treatment for an electrode slurry of a practical battery, it is difficult to separate the inorganic carbon formed in the slurry by applying pressure.

Therefore, in the present invention, it is preferable to perform deaeration under reduced pressure.

Herein, by the increase in the interfacial area caused by the expansion and contraction effect of bubbles of the carbonic acid gas by cavitation (local boiling) in addition to the effect of increasing the diffusion rate of the inorganic carbon (carbonic acid gas) into the raw material slurry through flow (mixing) described above by causing the raw material slurry to flow through the cavitation causing portion, and the effect of dissolving the carbonic acid gas in the bubbles in the raw material slurry by being condensed due to pressure recovery (the effect of compensating for the decrease in the dissolution rate due to the decrease in pressure and exceeding this), the dissolution rate can be increased and the neutralization reaction can be accelerated. As a result, contact between the raw material slurry and the inorganic carbon can be further accelerated, and it is possible to neutralize the alkali component in the raw material slurry containing an alkali metal complex oxide within a shorter period of time. In addition to this, an excess of inorganic carbonic acid after the neutralization treatment of the alkali component in the raw material slurry can be easily deaerated in the form of bubbles by causing cavitation (local boiling), so that impurities do not remain in the interior of the battery, a non-conductive layer is not formed in the interface between a current collector and an active material layer, and the conductivity or the battery characteristics can be improved.

Thus, by adopting the method of causing cavitation (local boiling), the neutralization treatment of the alkali component in the raw material slurry and a deaeration treatment of the slurry after the neutralization treatment can be performed in the same process.

That is, while causing cavitation (local boiling) by the inorganic carbon supplied to the raw material slurry flowing along the path, the raw material slurry can be reduced in pressure and deaerated by further causing cavitation (local boiling) in the raw material slurry having undergone the neutralization treatment on the alkali component in the raw material slurry, the neutralization treatment of the alkali component in the raw material slurry and the deaeration treatment of the slurry after the neutralization treatment can be performed in the same process. Therefore, this method is economical.

The raw material slurry contains an active material and a binder as solid contents. If necessary, a conductive auxiliary agent is added to the raw material slurry.

The active material is not particularly limited as long as it is an alkali metal complex oxide. In a case where the nonaqueous electrolyte secondary battery is a lithium secondary battery, examples of the active material include lithium complex oxides, that is, the materials such as lithium cobaltate ($LiCoO_2$), lithium nickelate ($LiNiO_2$), a ternary material ($LiNi_{0.33}Co_{0.33}Mn_{0.33}O_2$), a nickel-enriched ternary material ($LiNi_{0.5}Co_{0.2}Mn_{0.3}O_2$(NCM523), $LiNi_{0.6}Co_{0.2}Mn_{0.2}O_2$ (NCM622), $LiNi_{0.8}Co_{0.1}Mn_{0.1}O_2$ (NCM811)), lithium nickel-cobalt-aluminate ($LiNi_{0.8}Co_{0.15}Al_{0.05}O_2$), lithium iron phosphate ($LiFePO_4$), lithium manganese-iron-phosphate ($LiFe_{0.5}Mn_{0.5}PO_4$), lithium manganese phosphate ($LiMnPO_4$), lithium cobalt phosphate ($LiCoPO_4$), lithium nickel phosphate ($LiNiPO_4$), lithium vanadium phosphate ($Li_3V_2(PO_4)_3$), lithium iron silicate ($Li_2FeSiO_4$), lithium manganese silicate ($Li_2MnSiO_4$), a lithium-enriched solid solution-based material ($Li_2MnO_3$—$LiNi_{0.33}Mn_{0.33}Co_{0.33}O_2$), spinel-type lithium manganate ($LiMn_2O_4$), spinel-type lithium nickel-manganate ($LiNi_{0.5}Mn_{1.5}O_4$), and lithium nickel-iron-manganate ($LiNi_{0.33}Fe_{0.33}Mn_{0.33}O_2$). One kind of these may be used singly, or two or more kinds of these may be used in combination. The ratio between the elements in the above active materials may be slightly different from the ratio described above. Furthermore, in a case where the nonaqueous electrolyte secondary battery is a sodium secondary battery, the active material may be a sodium complex oxide, that is, lithium as the aforementioned alkali metal element may be substituted with sodium. In a case where the nonaqueous electrolyte secondary battery is a potassium secondary battery, lithium may be substituted with potassium.

Examples of the binder include generally used materials such as polyvinylidene fluoride (PVDF), polytetrafluoroethylene (PTFE), polyimide (PI), polyamide, polyamide-imide (PAI), aramid, polyacrylic acid, polyacrylate, an acrylic acid ester, styrene butadiene rubber (SBR), urethane, an ethylene-vinyl acetate copolymer, a styrene-ethylene-butylene-styrene copolymer (SEBS), carboxymethyl cellulose (CMC), cellulose sulfate, methyl cellulose ether, methyl ethyl cellulose ether, ethyl cellulose ether, low-nitrogen hydroxyethyl cellulose dimethyldiallyl ammonium chloride (polyquaternium-4), [2-hydroxy-3-(trimethylammonio)propyl]hydroxyethyl cellulose chloride (polyquaternium-10), [2-hydroxy-3-(lauryldimethylammonio)propyl]hydroxyethyl cellulose chloride (poluquaternium-24), polyvinylalcohol (PVA), polyvinyl butyral (PVB), ethylene vinyl alcohol, polyethylene (PE), polypropylene (PP), and starch. One kind of these may be used singly or two or more kinds of these may be used in combination.

The conductive auxiliary agent is not particularly limited, and examples thereof include a metal, a carbon material, a conductive polymer, conductive glass, and the like. Among these, a carbon material is preferable, and specific examples thereof include acetylene black (AB), Ketjenblack (KB), vapor-grown carbon fiber (VGCF), carbon nanotubes (CNT), graphite, hard carbon, soft carbon, furnace black, graphene, glassy carbon, carbon nanohorns, and the like. One kind of these may be used singly, or two or more kinds of these may be used in combination.

In the active material layer of the positive electrode, for example, provided that the total amount of the positive electrode active material, the binder, and the conductive material is 100% by mass, the amount of the electrode active material is preferably 60% to 99% by mass, the amount of the binder is preferably 0.1% to 25% by mass, and the amount of the conductive material is preferably 0.1% to 10% by mass. The amount of the electrode active material is more preferably 80% to 95% by mass, the amount of the binder is more preferably 0.5% to 15% by mass, and the amount of the conductive material is more preferably 0.5% to 5% by mass.

In a case where the active material layer of the positive electrode is composed as above, a sufficient binding force and a conductivity improving effect are obtained.

The neutralizer is not particularly limited as long as it is dissolved inorganic carbon obtained by dissolving carbonic acid gas in the solvent of the slurry. That is, the dissolved inorganic carbon may be generated using a gas such as air containing carbonic acid gas or the carbonic acid gas generated from a solid including dry ice. In order to efficiently obtain the dissolved inorganic carbon at a relatively low pressure, it is preferable to use a high-concentration carbonic acid gas.

By using the slurry for a positive electrode of a nonaqueous electrolyte secondary battery that is obtained by the method for manufacturing a slurry for a positive electrode of a nonaqueous electrolyte secondary battery of the present invention, a positive electrode of a nonaqueous electrolyte secondary battery, specifically, a positive electrode of a nonaqueous electrolyte secondary battery coated with an alkali metal carbonate can be manufactured. By using the positive electrode, a nonaqueous electrolyte secondary battery can be manufactured. Furthermore, the nonaqueous electrolyte secondary battery can be suitably used in electronic devices.

Next, an apparatus for manufacturing a slurry for a positive electrode of a nonaqueous electrolyte secondary battery (hereinafter referred to as "dispersing and mixing apparatus"), which implements the method for manufacturing a slurry for a positive electrode of a nonaqueous electrolyte secondary battery, will be described with reference to FIGS. 1 to 5.

Solvent Storage Tank

In the present embodiment, a solvent storage tank Y has a function of supplying a solvent R (a solid content P if necessary) in addition to a function of circulating the solvent R via circulation flow paths 16 and 18 between the solvent storage tank Y and an aspirating and stirring pump X. Before starting an operation of the aspirating and stirring pump X, a predetermined amount of the solvent R (if necessary, the solid content P) for producing the raw material slurry is input to and stored in the solvent storage tank Y, or the solid content P is input to the solvent storage tank Y while circulating the solvent R with the aspirating and stirring pump X.

Figure 5:
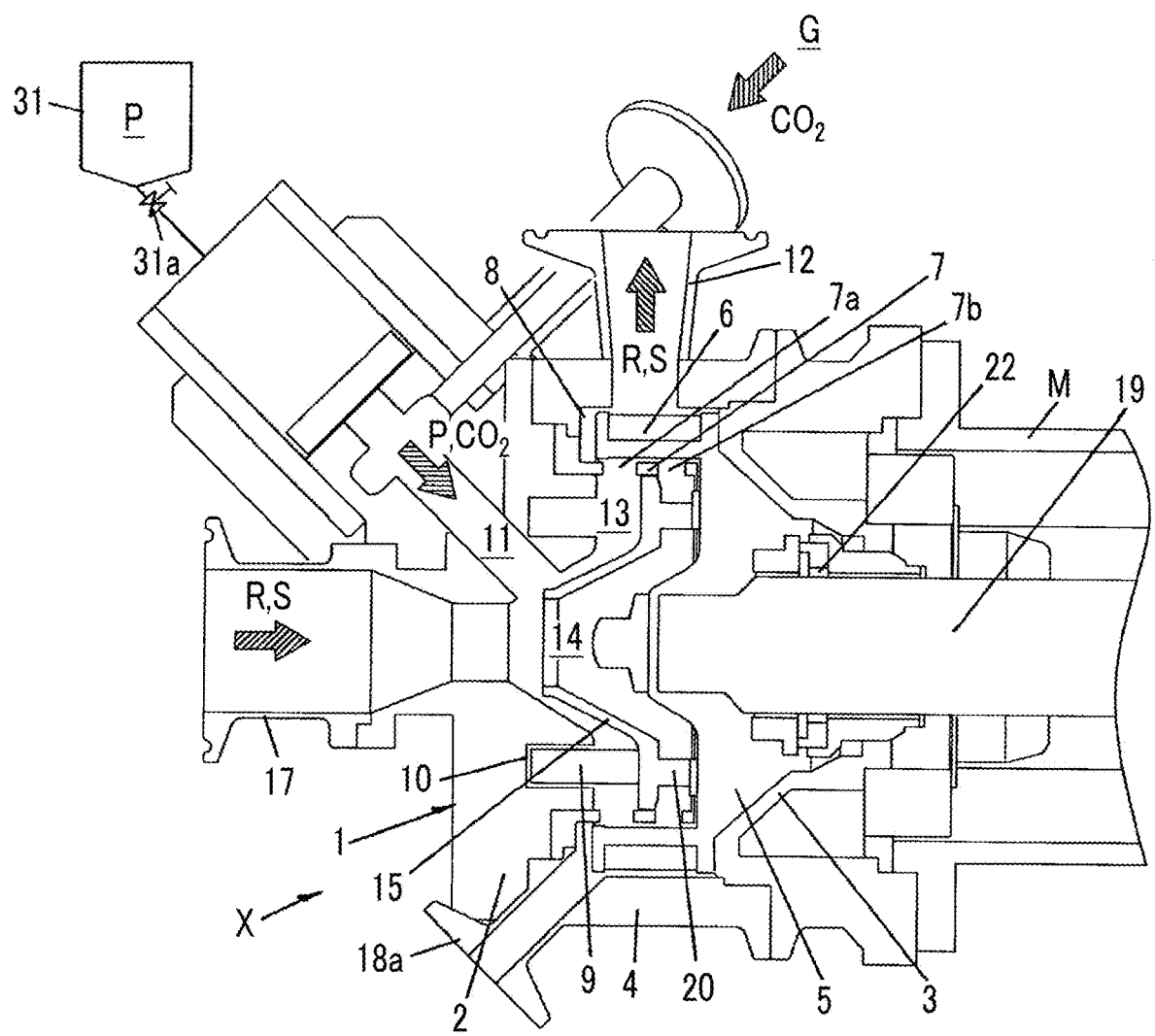
FIG. 5 is a longitudinal sectional view illustrating an internal structure of a main part of the manufacturing apparatus.

Here, as a method of supplying the solid content P, in the present embodiment, as illustrated in FIG. 5, a method in which a solid content storage hopper 31 that stores a predetermined amount of the solid content P is provided, and the solid content P stored in the solid content storage hopper 31 is directly negative pressure-aspirated into a casing 1 of the aspirating and stirring pump X from a first supply portion 11 so as to be sequentially supplied via an input shutter 31a by the action of a negative pressure generated by rotation of stirring blades 6.

Figure 6A:
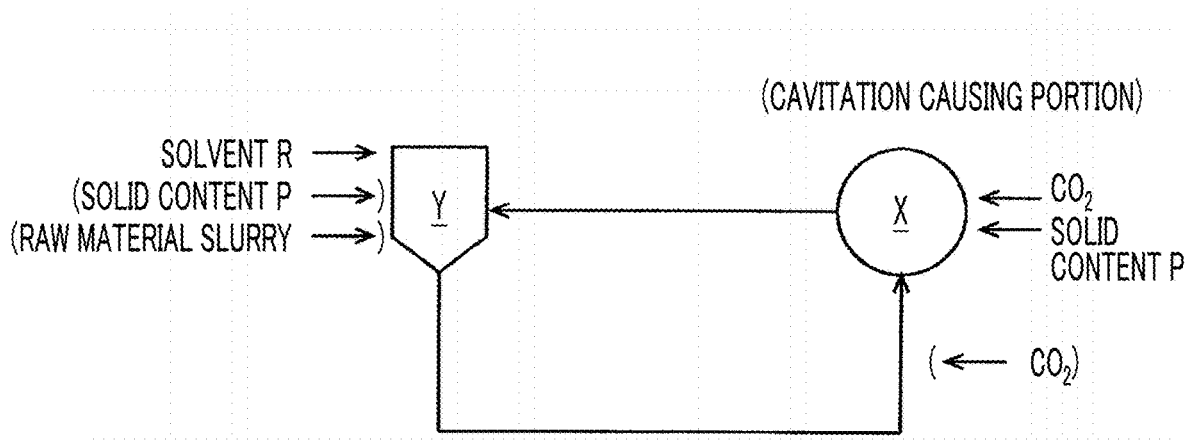
FIGS. 6A to 6C is a flowchart of the method for manufacturing a slurry for a positive electrode of a nonaqueous electrolyte secondary battery of the present invention.

Furthermore, as the method of supplying the solid content P, the solid content stored in the solid content storage hopper as described above may be supplied to the aspirating and stirring pump X together with the solvent R by being aspirated by the ejector effect obtained by the flow of the solvent R partway through the circulation flow path 16 on which the solvent R is supplied from the solvent storage tank Y to the aspirating and stirring pump X, or as illustrated in FIG. 6A, the solid content P may be input to and stored in the solvent storage tank Y together with the solvent R in advance. Alternatively, a raw material slurry produced by stirring and mixing a predetermined amount of the solvent R and the solid content P using a stirring and mixing device or the like may be input to or stored in the solvent storage tank Y.

The supply of the solvent R or the raw material slurry to the aspirating and stirring pump X may be achieved by not only the aspiration of the aspirating and stirring pump X but also a liquid feed pump (not illustrated).

The configuration of the solvent storage tank Y is not particularly limited as long as it has a storage function, and for example, one having a stirring mechanism (not illustrated) can also be used.

Figure 6B:
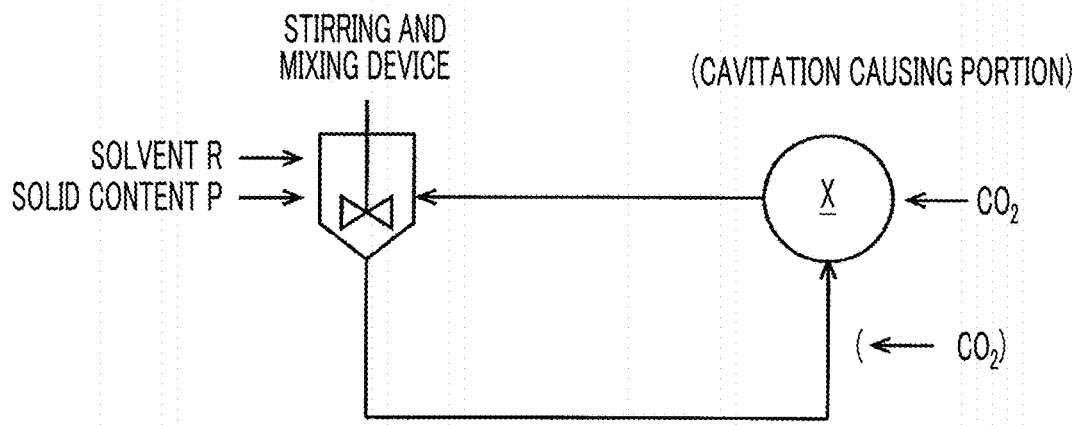

Specifically, as illustrated in FIG. 6B, by using a stirring and mixing device such as a planetary mixer instead of the solvent storage tank Y, the raw material slurry may be produced by stirring and mixing a predetermined amount of the solvent R and the solid content P, and the produced raw material slurry may be supplied to the aspirating and stirring pump X.

Aspirating and Stirring Pump

The aspirating and stirring pump X will be described based on FIG. 5.

The aspirating and stirring pump X is constituted with a casing 1 including a cylindrical outer peripheral wall portion 4 having openings on both ends thereof that are closed by a front wall portion 2 and a rear wall portion 3, a rotor 5 that is provided in the interior of the casing 1 so as to be driven to freely rotate concentrically, a cylindrical stator 7 that is disposed in a state of being concentrically fixed to the front wall portion 2 in the interior of the casing 1, a pump driving motor M that rotates and drives the rotor 5, and the like.

On the outside of the rotor 5 in the radial direction, a plurality of stirring blades 6 protrude to the front side which is the front wall portion 2 side, and are integrated with the rotor 5 in a state of being arrayed at the same interval in the circumferential direction.

On the cylindrical stator 7, a plurality of through holes 7a and 7b functioning as restriction flow paths are arrayed in the circumferential direction. The stator 7 is disposed in and fixed to the front wall portion 2, in a position that is the front side of the rotor 5 and the inside of the stirring blades 6 in the radial direction. Between the stator 7 and the outer peripheral wall portion 4 of the casing 1, a ring-like blade chamber 8 is formed which functions as a discharge chamber as well and along which the stirring blades 6 circle.

The first supply portion 11 is provided in a position closer to the outer peripheral side than to the central axis (axis of a driving shaft 19 of the motor M) of the front wall portion 2.

Here, in the present embodiment, the solid content storage hopper 31 is provided, and the solid content P stored in the solid content storage hopper 31 directly negative pressure-aspirated into the casing 1 of the aspirating and stirring pump X from the first supply portion 11 so as to be supplied via the input shutter 31a.

Similarly, by introducing the carbonic acid gas from the first supply portion 11 into a first introduction chamber 13 of the casing 1, the carbonic acid gas is directly negative pressure-aspirated into the casing 1 of the aspirating and stirring pump X to supply the carbonic acid gas to the raw material slurry S flowing along the path. As a result, the carbonic acid gas is dissolved in the raw material slurry S and the neutralization treatment is performed on the alkali component in the raw material slurry S.

A ring-like groove 10 is formed on the inner surface of the front wall portion 2 of the casing 1.

A cylindrical discharge portion 12, which discharges the raw material slurry S produced by mixing the solid content P with the solvent R, is provided at one site of a cylindrical outer peripheral wall portion 4 of the casing 1 in the circumferential direction, in a state of extending in a tangential direction tangent of the outer peripheral wall portion 4 and communicating with the blade chamber 8.

The raw material slurry S discharged from the discharge portion 12 is returned to the solvent storage tank Y via the circulation flow path 18.

A second supply portion 17 is provided in the central portion (axis of the driving shaft 19 of the motor M) of the front wall portion 2 of the casing 1.

The solvent R (the raw material slurry S returned to the solvent storage tank Y) input to and stored in the solvent storage tank Y is negative pressure-aspirated and supplied to the second supply portion 17 via the circulation flow path 16.

A divider 15, which divides the inner peripheral side of the stator 7 into a first introduction chamber 13 on the front wall portion 2 side and a second introduction chamber 14 on the rotor 5 side, is provided on the front side of the rotor 5 in a state of rotating together with the rotor 5. Moreover, scraping blades 9 are provided in the divider 15 on the front wall portion 2 side. A plurality of coaxial scraping blades 9 are arrayed at the same interval in the circumferential direction. The scraping blades 9 are disposed such that each of them can circle together with the rotor 5, in a state where a tip portion thereof is inserted in the ring-like groove 10.

The first introduction chamber 13 and the second introduction chamber 14 are constituted, such that they communicate with the blade chamber 8 through the plurality of through holes 7a and 7b of the stator 7, the first supply portion 11 communicates with the first introduction chamber 13, and the second supply portion 17 communicates with the second introduction chamber 14.

Specifically, the first introduction chamber 13 and the blade chamber 8 communicate with each other through the plurality of through holes 7a on the first introduction chamber 13 side that are disposed at the same interval along the circumferential direction in a portion approaching the first introduction chamber 13 in the stator 7. The second introduction chamber 14 and the blade chamber 8 communicate with each other through the plurality of through holes 7b on the second introduction chamber 14 side that are disposed at the same interval along the circumferential direction in a portion approaching the second introduction chamber 14 in the stator 7.

Each portion of the aspirating and stirring pump X will be described.

The rotor 5 has a shape in which the front surface thereof protrudes approximately in the form of a truncated cone shape. On the outer peripheral side of the rotor 5, the plurality of stirring blade 6 are arrayed at the same interval in a state of protruding toward the front. The plurality of stirring blades 6 are disposed at the same interval in the circumferential direction. Each of the stirring blades 6 protrudes from the outer peripheral side of the rotor 5 toward the inner peripheral side, such that the stirring blade 6 gradually inclines to the back of the rotation direction as the blade becomes close to the outer peripheral side from the inner peripheral side. The inner diameter of the tip portion of each of the stirring blades 6 is slightly larger than the outer diameter of the stator 7.

The rotor 5 is positioned in the casing 1 coaxially with the casing 1. In this state, the rotor 5 is connected to the driving shaft 19 of the pump driving motor M which penetrates the rear wall portion 3 and is inserted in the casing 1, and is rotated and driven by the pump driving motor M.

Further, the driving shaft 19 of the pump driving motor M is provided with a mechanical seal 22 forming a seal portion for preventing the solvent R in the casing 1 from leaking toward the pump driving motor M side.

The rotor 5 has a constitution in which the rotor 5 is driven to rotate in a direction along which the tip portion of each of the stirring blades 6 becomes the front side, whereby so-called cavitation (local boiling) occurs on a surface (rear surface) of each of the stirring blades 6 that becomes a rear side in the rotation direction.

The divider 15 is approximately in the form of a funnel having an outer diameter slightly smaller than the inner diameter of the stator 7.

The divider 15 has a constitution in which the divider 15 is mounted on the front surface of the rotor 5 through interval maintaining members 20 and when the rotor 5 is driven to rotate, the divider 15 rotates together with the rotor 5.

In the present embodiment, the cylindrical second supply portion 17 is provided in the central portion of the front wall portion 2 of the casing 1, coaxially with the casing 1.

The first supply portion 11 is provided in the front wall portion 2 such that the opening portion thereof open to the interior of the casing 1 is positioned on the lateral side of the opening portion of the second supply portion 17 facing the interior of the casing 1. The first supply portion 11 is provided in the front wall portion 2 of the casing 1, in an inclined state. The inclination angle of the first supply portion 11 is about 45 degrees.

In the present embodiment, the solid content P stored in the solid content storage hopper 31 can be sequentially supplied to the first supply portion 11 via the input shutter 31*a*, and the carbonic acid gas can also be introduced thereto.

The stator 7 is mounted on and fixed to the inner surface (surface facing the rotor 5) of the front wall portion 2 of the casing 1 such that the front wall portion 2 of the casing 1 and the stator 7 are integrated. As the stirring blades 6 of the rotor 5 are rotated, the raw material slurry S is discharged via the discharge portion 12, and the solvent R input to and stored in the solvent storage tank Y and the raw material slurry S returned to the solvent storage tank Y are introduced via the second supply portion 17, so that the pressure of the interior of the aspirating and stirring pump X is reduced.

The divider 15 provided with the scraping blades 9 is mounted on the front surface of the rotor 5 in a state of being spaced apart from the front surface of the rotor 5 by the interval maintaining members 20. In a state where the tip portion of the divider 15 faces the second supply portion 17 with an interval therebetween, the rotor 5 is disposed in the casing 1.

As a result, a constitution is obtained in which between the protruding front surface of the rotor 5 and the rear surface of the divider 15, the tapered second introduction chamber 14 whose diameter is reduced toward the front wall portion 2 side of the casing 1 is formed, and the second supply portion 17 communicates with the second introduction chamber 14 through the tip portion of the divider 15.

Furthermore, between the front wall portion 2 of the casing 1 and the front surface of the divider 15, the ring-like first introduction chamber 13 communicating with the first supply portion 11 is formed.

In a case where the rotor 5 is driven to rotate, the divider 15 rotates together with the rotor 5. In this constitution, even in a state where the rotor 5 and the divider 15 rotate, the second supply portion 17 keeps communicating with the second introduction chamber 14 through the tip portion of the divider 15.

Control Portion

A control portion included in the dispersing and mixing apparatus is not shown in the drawing. The control portion is composed of a known arithmetic processing unit including CPU, a storage portion, and the like, and is constituted so as to be able to control the operation of the aspirating and stirring pump X constituting the dispersing and mixing apparatus.

Particularly, the control portion is constituted so as to be able to control the circumferential speed of the stirring blades 6 (rotation speed of the rotor 5). In this constitution, by setting the circumferential speed of the stirring blades 6 (rotation speed of the rotor 5) such that the internal pressure of the first introduction chamber 13 and the second introduction chamber 14 becomes a predetermined negative pressure, and by rotating the stirring blades 6 at the set circumferential speed (rotation speed of the rotor 5), the control portion can make the region in the blade chamber 8, to which the slurry reaches immediately after passing through at least the through holes 7*b* of the stator 7 on the second introduction chamber 14 side (and the through holes 7*a* on the first introduction chamber 13 side), as a microbubble region where a number of microbubbles of the solvent R occur in series all around the interior of the blade chamber 8.

Operation of Dispersing and Mixing Apparatus (Manufacturing Process of Slurry)

Next, the operation of the dispersing and mixing apparatus (manufacturing process of the slurry) will be described.

First, before starting the operation of the aspirating and stirring pump X, a predetermined amount of the solvent R is input to and stored in the solvent storage tank Y.

In this state, when the operation (high-speed operation) of the aspirating and stirring pump X is started, the inside of the aspirating and stirring pump X is at a negative pressure, and the solvent R input to and stored in the solvent storage tank Y in the second supply portion 17 is supplied by negative pressure aspiration via the circulation flow path 16 (step 1).

In this state, a predetermined amount of the solid content P is directly negative pressure-aspirated into the first introduction chamber 13 of the casing 1 of the aspirating and stirring pump X from the first supply portion 11 so as to be sequentially supplied via the input shutter 31a from the solid content storage hopper 31 (step 2).

In the present embodiment, an example in which the solid content P is input from the solid content storage hopper 31 is described. However, the solid content P may also be input to the solvent storage tank Y in advance.

The solid content P supplied from the first supply portion 11 into the first introduction chamber 13 of the casing 1 of the aspirating and stirring pump X that joins with the solvent R supplied to the second supply portion 17 and is introduced into the blade chamber 8 to become the raw material slurry S, and the raw material slurry S is discharged from the discharge portion 12 and is returned to the solvent storage tank Y via the circulation flow path 18. The raw material slurry S is circulated by negative pressure aspiration via the circulation flow path 16 while the aspirating and stirring pump X is operated (step 3).

The raw material slurry S circulated and supplied to the second supply portion 17 is introduced into the second introduction chamber 14, and is disintegrated by being affected by the shearing action while passing through the through hole 7b on the second introduction chamber 14 side. At this time, the raw material slurry S is introduced into the blade chamber 8 in a state where the flow rate thereof is limited via the through hole 7b on the second introduction chamber 14 side. In the blade chamber 8, the raw material slurry S is disintegrated by being affected by expansion and contraction of microbubbles generated by cavitation (local boiling) caused at the back surface of the stirring blades 6 rotating at a high speed and the shearing action due to the stirring blades 6, so that the raw material slurry S in which the aggregate (lump) of the solid content P is further reduced is discharged from the discharge portion 12.

Herein, the control portion is constituted so as to able to control the circumferential speed of the stirring blades 6 (rotation speed of the rotor 5). In this constitution, by setting the circumferential speed of the stirring blades 6 (rotation speed of the rotor 5) such that the internal pressure of the second introduction chamber 14 becomes a predetermined negative pressure, and by rotating the stirring blades 6 at the set circumferential speed (rotation speed of the rotor 5), the control portion can make at least the region in the blade chamber 8, to which the slurry reaches immediately after passing through the through holes 7a and 7b of the stator 7 on the first introduction chamber 13 side and the second introduction chamber 14 side, as a microbubble region where a number of microbubbles of the solvent R occur in series all around the interior of the blade chamber 8.

In this way, the solvent R permeating the aggregate (so-called lump) of the solid content P foams all around the interior of the blade chamber 8, and hence the disintegration of the aggregate is accelerated. In addition, due to the expansion and contraction repeated when the generated microbubbles are pressurized and disappear in the blade chamber 8, the dispersion of the solid content P is further accelerated. As a result, it is possible to produce a high-quality raw material slurry S in which the solid content P is excellently dispersed in the solvent R substantially in the entirety of the raw material slurry S present all around the interior of the blade chamber 8.

Operation of Dispersing and Mixing Apparatus (Neutralization Treatment Process)

Next, the operation of the dispersing and mixing apparatus (neutralization treatment process) will be described.

A neutralization treatment is performed on the raw material slurry S while the operation of the aspirating and stirring pump X continues.

In the neutralization treatment, by introducing the carbonic acid gas into the first introduction chamber 13 of the casing 1 by a carbonic acid gas supply mechanism G, the carbonic acid gas is supplied to the raw material slurry S flowing along the path. As a result, the carbonic acid gas is dissolved in the raw material slurry S and the alkali component in the raw material slurry S undergoes the neutralization treatment.

Herein, a place to which the carbonic acid gas is introduced may be set to, in addition to the first introduction chamber 13 of the casing 1 of the present embodiment, any place such as the second introduction chamber 14, the ring-like blade chamber 8 along which the stirring blades 6 circle, and the circulation flow path 16, and the carbonic acid gas supply mechanism G can be connected thereto.

In this case, it is preferable that the carbonic acid gas is introduced along the flow of the raw material slurry S (in a tangential direction tangent to the flow).

Incidentally, in the present embodiment, the timing for introducing the carbonic acid gas is set to the above step 3 (after the raw material slurry S is produced (post-supply)). However, as shown in FIG. 7, the timing may be set to the step 2 (the solid content P and the carbonic acid gas are supplied to the solvent R flowing along the path while causing the solvent R to flow along the path (simultaneous supply with the solid content P)), the step 1 (the carbonic acid gas (inorganic carbon) is supplied (pre-supply) to the solvent R flowing along the path while causing the solvent R to flow along the path), or an appropriate combination thereof.

Herein, by performing the neutralization treatment while causing cavitation (local boiling) by causing the raw material slurry S to flow through a cavitation causing region, bubbles of the inorganic carbon are repeatedly expanded and contracted by the cavitation (local boiling), and thus the contact area with the solvent or the raw material slurry increases, so that the neutralization can be rapidly advanced. As a result, it is possible to neutralize the alkali component in the raw material slurry S within a shorter period of time.

Operation of Dispersing and Mixing Apparatus (Deaeration Treatment Process)

Next, the operation (deaeration treatment process) of the dispersing and mixing apparatus will be described.

In the deaeration treatment, cavitation (local boiling) is caused by operating (high-speed operation) the aspirating and stirring pump X for a predetermined time, whereby the inorganic carbon in the slurry can be deaerated as carbonic acid gas.

The raw material slurry S (the slurry for a positive electrode of a nonaqueous electrolyte secondary battery) having undergone the deaeration treatment is supplied to a subsequent process through a discharge pipe 18a provided in a state of communicating with the blade chamber 8.

Thereafter, the operation of the aspirating and stirring pump X is stopped.

EXAMPLES

Manufacturing of Aqueous Slurry of High Capacity Type Alkali Metal Complex Oxide Examples 1 to 7

Raw material slurries of Examples 1 to 7 and Comparative Example 1 were manufactured using the apparatus for manufacturing a slurry for a positive electrode of a non-aqueous electrolyte secondary battery of a nonaqueous electrolyte secondary battery (the dispersing and mixing apparatus), and using a high capacity type alkali metal complex oxide (lithium nickel-cobalt-aluminate (LiNi$_{0.8}$Co$_{0.15}$Al$_{0.05}$O$_2$)) as an active material, an acrylic acid ester as a binder, and acetylene black (AB) as a conductive auxiliary agent.

The raw material slurry was adjusted such that, provided that the amount of solid contents was 100% by mass, the amount of the active material became 90% by mass, the amount of the binder became 5% by mass, and the amount of the conductive auxiliary agent became 5% by mass. The concentration of the solid contents (the active material, the binder, and the conductive auxiliary agent) in the raw material slurry was 41% by mass.

A predetermined amount of water was introduced into the solvent storage tank Y operating at a rotation speed of 6000 rpm and the circulation of the water was confirmed. Thereafter, predetermined amounts of the active material, the conductive auxiliary agent, and the binder were sequentially supplied, thereby manufacturing a raw material. The supply timing of carbonic acid gas, the supply conditions of carbonic acid gas, the neutralization time, and the pH of the manufactured raw material slurry are shown in Table 1.

In addition, after manufacturing the slurry, the deaeration process was performed for 300 seconds under the same conditions.

Example 8

In the apparatus for manufacturing a slurry for a positive electrode of a nonaqueous electrolyte secondary battery (the dispersing and mixing apparatus), as shown in FIG. 6B, a planetary mixer (stirring and mixing device) was used instead of the solvent storage tank Y, and a raw material slurry was manufactured using a high capacity type alkali metal complex oxide (lithium nickel-cobalt-aluminate (LiNi$_{0.5}$Co$_{0.15}$Al$_{0.05}$O$_2$)) as an active material, sodium acrylate as a binder, and acetylene black (AB) as a conductive auxiliary agent.

The raw material slurry was adjusted such that, provided that the amount of solid contents was 100% by mass, the amount of the active material became 90% by mass, the amount of the binder became 5% by mass, and the amount of the conductive auxiliary agent became 5% by mass. The concentration of the solid contents (the active material, the binder, and the conductive auxiliary agent) in the raw material slurry was 41% by mass.

For production of the raw material slurry, the slurry was produced through the following processes using the planetary mixer (manufactured by PRIMIX Corporation).

(1) Input and Semi-Dry Mixing

A predetermined amount of active material, acetylene black, and water was charged input to the planetary mixer, and stirring was performed using the blade at a rotation speed of 30 rpm for 30 minutes.

(2) Stiff Kneading

After scraping off the materials adhering to the blade of the planetary mixer with a resin spatula, water and the binder were added to the planetary mixer, and stirring was performed using the blade at a rotation speed of 30 rpm for 15 minutes. Thereafter, the rotation speed of the blade was increased to 60 rpm and stirring was further performed for 75 minutes.

(3) Thin Kneading

After scraping off the materials adhering to the blade of the planetary mixer with the resin spatula, the remaining water was further added to the planetary gear, and stirring was performed using the blade at a rotation speed of 30 rpm for 15 minutes. Thereafter, the rotation speed of the blade was increased to 80 rpm and stirring was further performed for 75 minutes, thereby obtaining a slurry.

The pH of this slurry was 12.5.

(4) Neutralization

Pipes were connected so that the slurry circulated between the planetary mixer and the apparatus for manufacturing a slurry for a positive electrode of a nonaqueous electrolyte secondary battery (the aspirating and stirring pump X of the dispersing and mixing apparatus), the aspirating and stirring pump X was operated at a rotation speed of 6000 rpm, and carbonic acid gas was supplied for neutralization. The supply conditions of the carbonic acid gas, the neutralization time, and the pH of the manufactured raw material slurry are shown in Table 1.

Example 9

A predetermined amount of raw materials such as an active material similar to those of Example 8 were input to a tank of a vertical disperser (DISPERMAT "VMA-GETZMANN" (manufactured by GMBH)), rotated at a rotation speed of 1000 rpm, and stirred for 10 minutes, thereby preparing a pre-slurry. A slurry was produced from the pre-slurry using a stirring device (FILMIX 56-50 type (manufactured by PRIMIX Corporation)) according to a thin film spin method at a circumferential speed of 40 m/s, and thereafter transferred to the solvent storage tank Y of the apparatus for manufacturing a slurry for a positive electrode of a nonaqueous electrolyte secondary battery (the dispersing and mixing apparatus).

The pH of this slurry was 12.6.

Pipes were connected so that the raw material slurry circulated between the solvent storage tank Y of the apparatus for manufacturing a slurry for a positive electrode of a nonaqueous electrolyte secondary battery (the dispersing and mixing apparatus) and the aspirating and stirring pump X, the aspirating and stirring pump X was operated at a rotation speed of 6000 rpm, and carbonic acid gas was supplied for neutralization. The supply conditions of the carbonic acid gas, the neutralization time, and the pH of the manufactured raw material slurry are shown in Table 1.

TABLE 1

| | Carbonic acid gas supply | | | | | |
|---|---|---|---|---|---|---|
| | Step 1 solution | Step 2 powder supply | Step 3 slurry production | Carbonic acid gas supply conditions | Carbonic acid gas supply time | Slurry pH |
| Comparative Example 1 | Absent | Absent | Absent | — | — | 11.0 |

TABLE 1-continued

| | | | | Carbonic acid gas supply | | |
|---|---|---|---|---|---|---|
| | Step 1 solution | Step 2 powder supply | Step 3 slurry production | Carbonic acid gas supply conditions | Carbonic acid gas supply time | Slurry pH |
| Example 1 | Absent | Absent | Present | 6 L/min | 180 seconds | 8.3 |
| Example 2 | Absent | Present | Absent | 0.1 MPa | 180 seconds | 8.8 |
| Example 3 | Absent | Present | Present | | 360 seconds | 7.5 |
| Example 4 | Present | Absent | Absent | | 120 seconds | 9.0 |
| Example 5 | Present | Present | Absent | | 300 seconds | 8.5 |
| Example 6 | Present | Present | Present | | 480 seconds | 7.2 |
| Example 7 | Present | Absent | Present | 1 L/min 0.05 MPa | 300 seconds | 8.3 |
| Example 8 | Absent | Absent | Present | 0.5 L/min 0.04 MPa | 300 seconds | 7.8 |
| Example 9 | Absent | Absent | Present | 0.5 L/min 0.04 MPa | 300 seconds | 7.6 |

As is evident from Table 1, it was confirmed that the pH level of the slurry of the raw material slurry (Comparative Example 1) not yet being subjected to the neutralization treatment was 11.0, 12.5, and 12.6, and the pH levels of the raw material slurries (Examples 1 to 9) having undergone the neutralization treatment were significantly lower than that of the raw material slurry (Comparative Example 1) not yet being subjected to the neutralization treatment.

Furthermore, it was confirmed that in a case where an aluminum foil was coated with the raw material slurry (Comparative Example 1) not yet being subjected to the neutralization treatment, a hydrogen gas occurred; however, the raw material slurries having undergone the neutralization treatment and the deaeration treatment did not generate a hydrogen gas even though an aluminum foil was coated with the raw material slurries, and the aluminum foil can be uniformly coated with the raw material slurries.

Evaluation of Battery Characteristics

An aluminum foil having a thickness of 20 μm was coated with a raw material slurry having undergone a neutralization treatment and a deaeration treatment, the slurry was dried, and the aluminum foil and an active material layer were then tightly bonded to each other by using a roll press machine, followed by a heat treatment (under reduced pressure, 160° C., for 12 hours or longer), thereby manufacturing a positive electrode for a test.

By using a metallic lithium foil, having an electric capacity 100 times or greater than that of the calculated capacity of the electrode for a test, as a counter electrode, a coin cell (CR2032) was prepared which included 1 mol/L LiPF$_6$/ethylene carbonate (EC):diethyl carbonate (DEC)=50:50 vol % as an electrolytic solution and non-woven glass cloth (manufactured by Toyo Roshi Kaisha, Ltd., # GA-100) as a separator.

The manufactured cell (lithium secondary battery) for a test was charged at a cut-off voltage of 2.5 to 4.3 V and at a 0.1C rate in an environment at a temperature of 30° C. and then discharged at a rate of 0.1 C. The discharge efficiency after 10 cycles is shown in Table 2.

TABLE 2

| | Discharge efficiency (%) |
|---|---|
| Comparative Example 1 | 60 |
| Example 1 | 88 |
| Example 2 | 89 |
| Example 3 | 89 |
| Example 4 | 90 |

TABLE 2-continued

| | Discharge efficiency (%) |
|---|---|
| Example 5 | 95 |
| Example 6 | 98 |
| Example 7 | 91 |
| Example 8 | 89 |
| Example 9 | 88 |

As is evident from Table 2, it was confirmed that in Comparative Example 1, the cycle characteristics were very poor because the electrode in which air bubbles were generated by reaction with Al was used, whereas in Examples 1 to 9, the discharge efficiency after 10 cycles was 88% or more, which was a level that could withstand practical use.

Figure 6C:
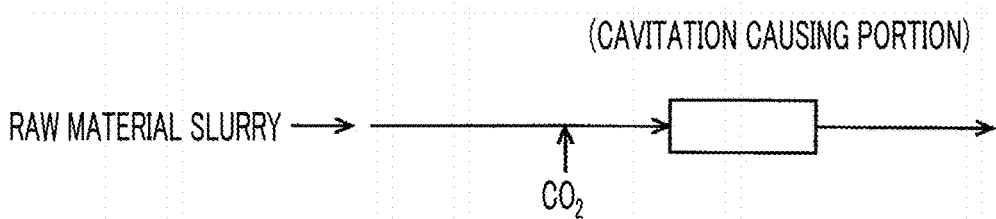

While the method for manufacturing a slurry for a positive electrode of a nonaqueous electrolyte secondary battery and the apparatus therefor of the present invention have been described based on the embodiments thereof. However, the present invention is not limited to the content described in the embodiments, and for example, as shown in FIG. 6C, the constitution of the present invention can be appropriately modified within a scope that does not depart from the gist of the present invention such as a constitution in which the path on which the raw material slurry flows constitutes a unidirectional flow path that does not constitute a circulation path, or a configuration in which the cavitation causing portion is constituted as a conduit having a restriction form (for example, various valves, orifices, cylindrical throttles, and the like). Furthermore, for example, the neutralization treatment and the deaeration treatment may also be performed without adopting a method of causing cavitation (local boiling) by not causing the raw material slurry to flow through the cavitation causing portion or not allowing the dispersing and mixing apparatus to include the cavitation causing portion.

The method for manufacturing a slurry for a positive electrode of a nonaqueous electrolyte secondary battery and the apparatus therefor of the present invention have characteristics in which it possible to produce a slurry for a positive electrode of a nonaqueous electrolyte secondary battery with an aqueous solvent that causes a light environmental load by allowing an alkali component in a slurry containing an alkali metal complex oxide to be neutralized within a short period of time. Therefore, the method for manufacturing a slurry for a positive electrode of a nonaqueous electrolyte secondary battery and the apparatus therefor can be suitably used in the uses of a method for manufacturing a slurry for a positive electrode of a nonaqueous electrolyte secondary battery and a slurry for a positive electrode of a nonaqueous electrolyte secondary battery.

It should be understood that the invention is not limited to the above-described embodiment, but may be modified into various forms on the basis of the spirit of the invention. Additionally, the modifications are included in the scope of the invention.

What is claimed is:

1. A method for manufacturing a slurry for a positive electrode of a nonaqueous electrolyte secondary battery using an aqueous solvent containing an alkali metal complex oxide, comprising:

while causing a raw material slurry containing a solid content and the solvent as slurry raw materials for a positive electrode of the nonaqueous electrolyte secondary battery to flow along a path, performing a neutralization treatment on an alkali component in the raw material slurry by inorganic carbon supplied to the raw material slurry flowing along the path.

2. The method for manufacturing a slurry for a positive electrode of a nonaqueous electrolyte secondary battery according to claim 1, further comprising:

a pre-process of producing the raw material slurry by supplying, while causing the solvent as the slurry raw material for a positive electrode of the nonaqueous electrolyte secondary battery to flow along the path, the solid content as the slurry raw material for a positive electrode of the nonaqueous electrolyte secondary battery to the solvent flowing along the path, wherein the neutralization treatment is performed on the alkali component in the raw material slurry by supplying the inorganic carbon to the raw material slurry flowing along the path.

3. The method for manufacturing a slurry for a positive electrode of a nonaqueous electrolyte secondary battery according to claim 1, wherein the neutralization treatment is performed on the alkali component in the raw material slurry while producing the raw material slurry by supplying, while causing the solvent as the slurry raw material for a positive electrode of the nonaqueous electrolyte secondary battery to flow along the path, the solid content as the slurry raw material for a positive electrode of the nonaqueous electrolyte secondary battery and the inorganic carbon to the solvent flowing along the path.

4. The method for manufacturing a slurry for a positive electrode of a nonaqueous electrolyte secondary battery according to claim 1, further comprising:

a pre-process of dissolving the inorganic carbon in the solvent by supplying, while causing the solvent as the slurry raw material for a positive electrode of the nonaqueous electrolyte secondary battery to flow along the path, the inorganic carbon to the solvent flowing along the path, wherein the neutralization treatment is performed on the alkali component in the raw material slurry while producing the raw material slurry by supplying the solid content as the slurry raw material for a positive electrode of the nonaqueous electrolyte secondary battery to the solvent flowing along the path and containing dissolved inorganic carbon.

5. The method for manufacturing a slurry for a positive electrode of a nonaqueous electrolyte secondary battery according to claim 1, wherein the inorganic carbon is supplied to the path at a negative pressure.

6. The method for manufacturing a slurry for a positive electrode of a nonaqueous electrolyte secondary battery according to claim 1, wherein the neutralization treatment is performed while causing cavitation by causing the raw material slurry, to which the inorganic carbon is supplied, to flow through a cavitation causing portion.

7. An apparatus for manufacturing a slurry for a positive electrode of a nonaqueous electrolyte secondary battery using an aqueous solvent containing an alkali metal complex oxide, comprising:

a path on which a raw material slurry containing a solid content and a solvent as slurry raw materials for a positive electrode of the nonaqueous electrolyte secondary battery flows; and an inorganic carbon supply portion supplying inorganic carbon to the raw material slurry flowing along the path, wherein a neutralization treatment is performed on an alkali component in the raw material slurry while causing the raw material slurry to flow along the path.

8. The apparatus for manufacturing a slurry for a positive electrode of a nonaqueous electrolyte secondary battery according to claim 7 further comprising:

unit that causes the path to be at a negative pressure, wherein the inorganic carbon is supplied to the path at the negative pressure.

9. The apparatus for manufacturing a slurry for a positive electrode of a nonaqueous electrolyte secondary battery according to claim 8 further comprising:

a cavitation causing portion which performs the neutralization treatment while causing cavitation by causing the raw material slurry to which the inorganic carbon is supplied to flow.

* * * * *